Figure 1:
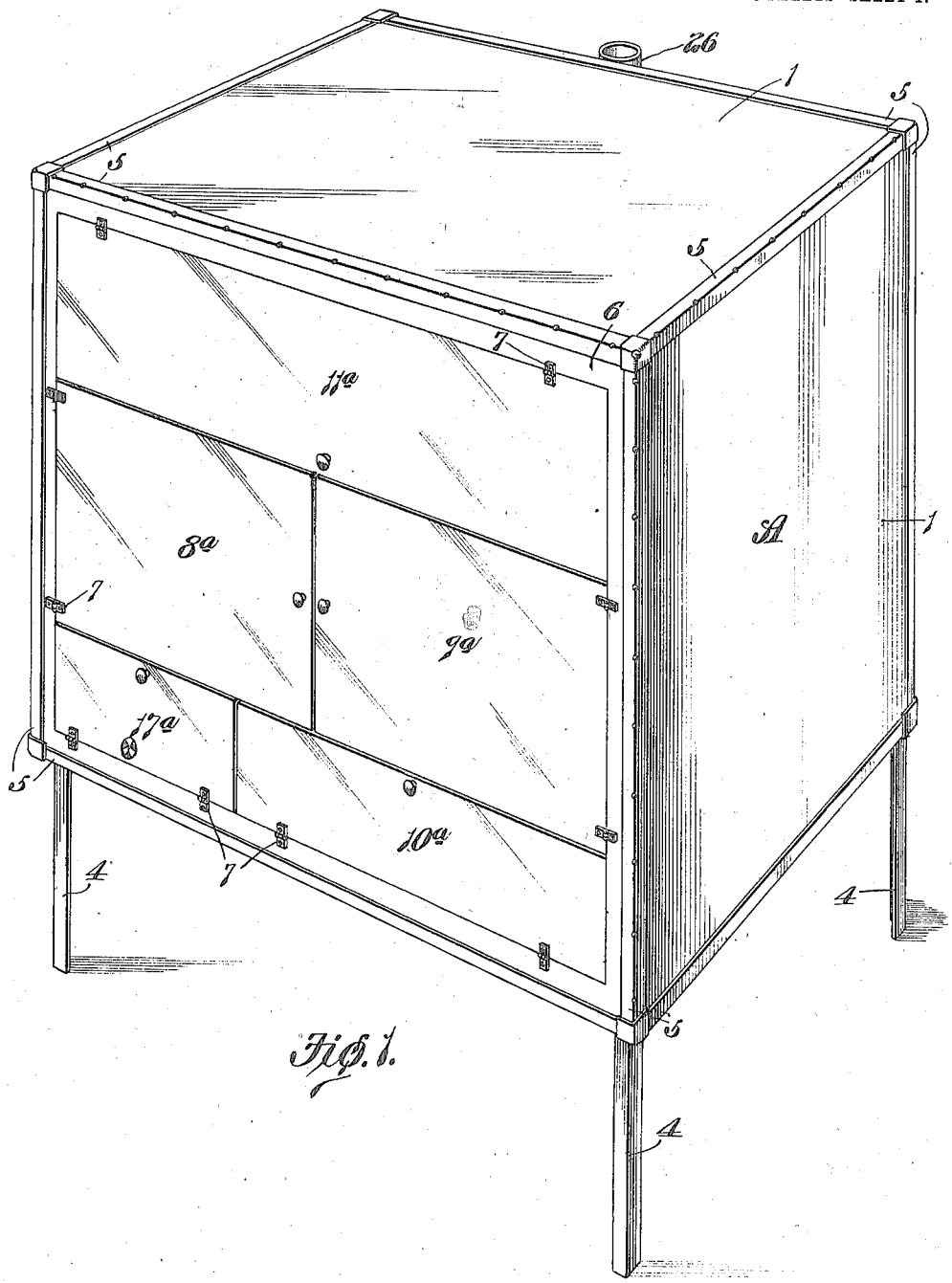

C. B. ADAMS.
COOKING STOVE OR CABINET.
APPLICATION FILED DEC. 12, 1908.
947,779.
Patented Feb. 1, 1910.
3 SHEETS—SHEET 2.
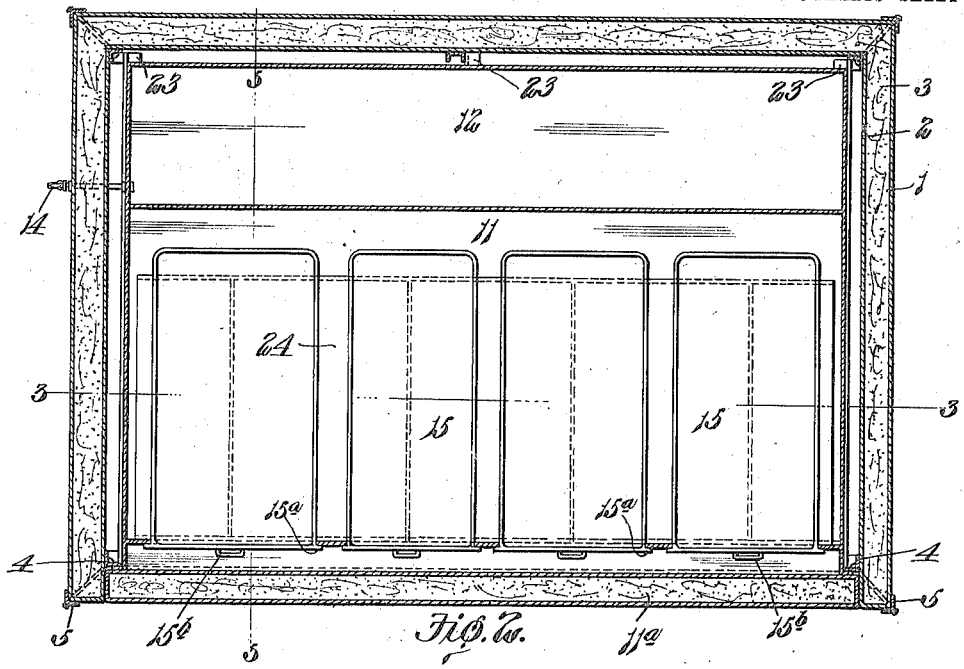
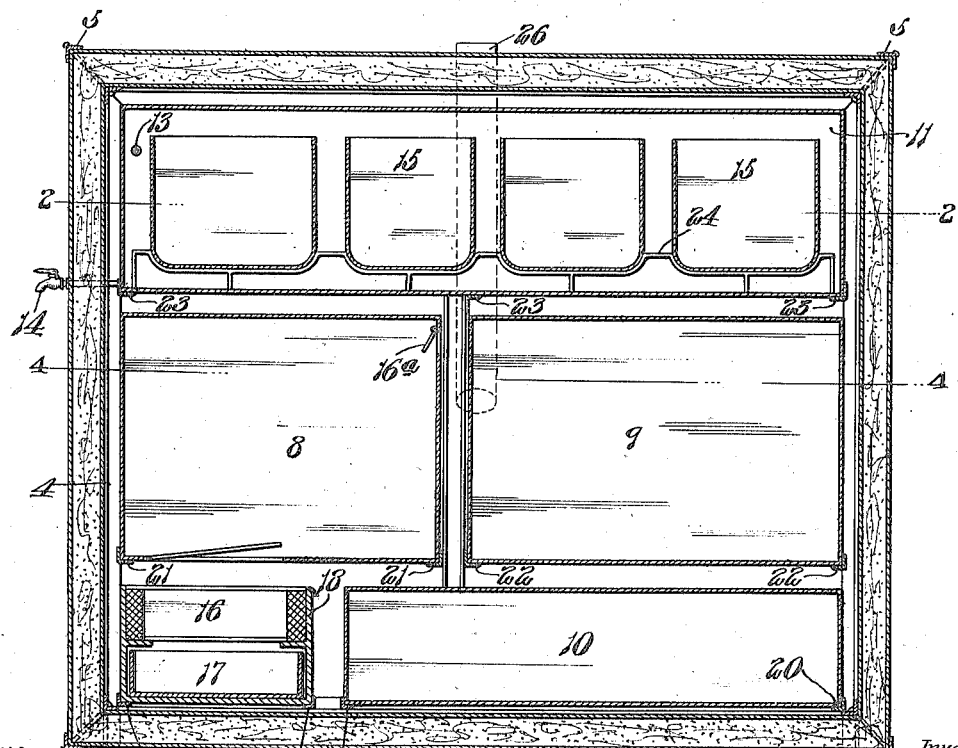

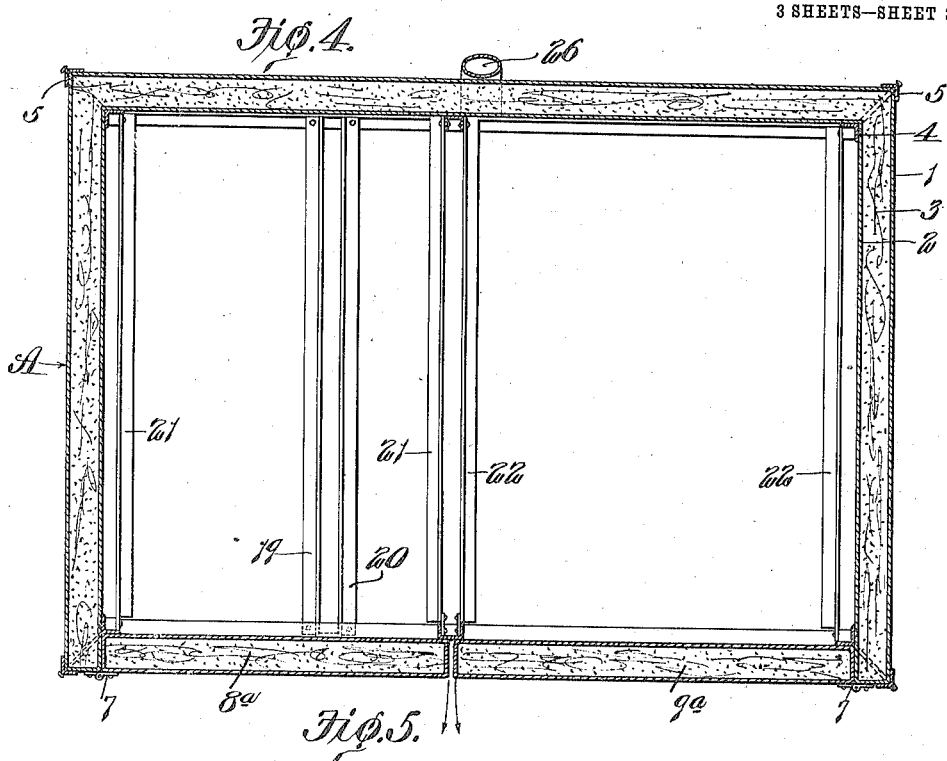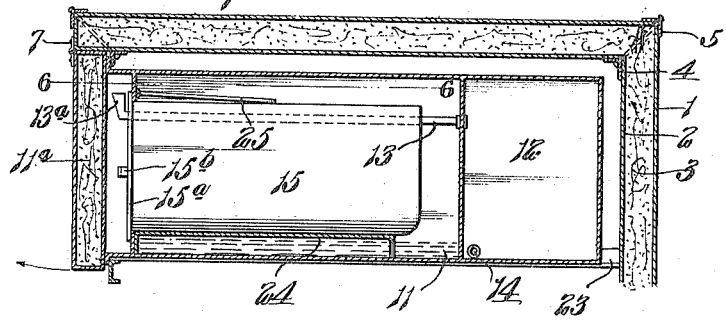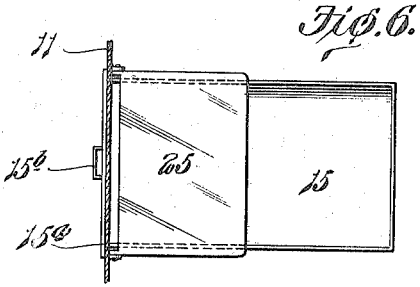

UNITED STATES PATENT OFFICE.

CHARLES B. ADAMS, OF FERGUSON, MISSOURI.

COOKING STOVE OR CABINET.

947,779.  Specification of Letters Patent.  Patented Feb. 1, 1910.

Application filed December 12, 1908. Serial No. 467,291.

*To all whom it may concern:*

Be it known that I, CHARLES B. ADAMS, a citizen of the United States, residing at Ferguson, St. Louis county, Missouri, have invented a certain new and useful Improvement in Cooking Stoves or Cabinets, of which the following is a full, clear, and exact description, such as will enable others skilled in the art to which it appertains to make and use the same, reference being had to the accompanying drawings, forming part of this specification, in which—

Figure 1 is a perspective view of a cooking stove or cabinet constructed in accordance with my invention; Fig. 2 is a horizontal sectional view taken approximately on the line 2—2 of Fig. 3; Fig. 3 is a vertical sectional view taken approximately on the line 3—3 of Fig. 2; Fig. 4 is a horizontal sectional view taken approximately on the line 4—4 of Fig. 3; Fig. 5 is a vertical sectional view taken approximately on the line 5—5 of Fig. 2; and Fig. 6 is a detail top plan view of one of the food receptacles inside of the steam compartment, said view being taken approximately on the line 6—6 of Fig. 5.

This invention relates to cooking stoves.

One object of my invention is to provide a stove that can be used for cooking all kinds of foods, and which is so constructed that the heat from the heating medium will not radiate from the stove, thus utilizing all of the heat units and eliminating the discomfiture from excessive heat to the person who operates the stove.

Another object is to provide a cooking stove that will broil, fry, bake, roast, boil or steam articles of food without raising the temperature of the room in which the stove is located or permeate the atmosphere with fumes or odors from the food being cooked. And still another object of my invention is to provide a cooking stove or cabinet comprising means for generating heat, a number of compartments and receptacles that are adapted to contain food and which are so designed that the heat can circulate around same, and an insulated casing which incases said heat-generating means and all of said food receptacles and compartments, said casing being so designed that the contents of said compartments and receptacles can be gotten at easily.

Other objects and desirable features of my invention will be hereinafter pointed out.

My improved cooking stove, briefly described, consists of an insulated casing or cabinet, means for generating heat in said casing, a number of compartments and receptacles adapted to contain articles of food and arranged inside of said casing in such a manner that the heat can circulate around each compartment or receptacle.

The casing can be constructed in various ways so as to produce a structure that will confine all of the heat units and prevent the heat from radiating into the surrounding atmosphere, and the food compartments or receptacles inside of said casing can also be constructed in various ways. Therefore, I do not wish it to be understood that my broad idea is limited to the construction herein shown for said construction illustrates only the preferred form of my invention.

Referring to the drawings, A designates an insulated casing or cabinet which consists of an outer shell 1, an inner shell 2, and a filling of some suitable heat-resisting material 3 interposed between same. The outer shell 1 can be made of various materials, such, for example, as metal, papier-mâché, wood, slate, fiber, marble or tile but the inner shell preferably consists of metal. In the construction herein shown the inner shell consists of a rectangular-shaped metal box open on one side and formed from a number of pieces of sheet metal that have their edge portions connected together by pieces of angle iron, the vertically disposed pieces of angle iron preferably extending downwardly through the bottom of the casing so as to form supporting legs 4. The outer shell also consists of sheets of metal that are connected together by corner-pieces 5, herein shown as short pieces of angle iron. The outer shell is provided with a front plate 6 that covers the space between the inner and outer shell, and a number of doors are connected by hinges 7 or other suitable devices to said front plate 6 so as to completely close the front side of the casing, said doors being preferably hollow and filled with some suitable heat-resisting material so as to completely insulate the front wall of the casing.

Hollow box-shaped members 8, 9 and 10 are arranged inside of the casing to form a broiling compartment, a baking compartment, and a warming oven, respectively, and a hollow box-shaped member 11 is also arranged in the casing over the broiling and baking compartments to form a steam compartment, all of said box-shaped members being preferably formed of sheet metal.

The compartment 11 is adapted to be partly filled with water which is converted into steam by the heat that circulates around the outside of said compartment, and a water compartment 12 is arranged in the rear end of the steam compartment for containing water that is used for domestic purposes. Water is introduced into the water compartment by means of a pipe 13 provided at one end with a funnel $13^a$ and the water is drawn out of said compartment by means of a faucet 14 which projects through the casing A.

A number of receptacles 15 for containing articles of food are arranged horizontally inside of the steam compartment 11, said receptacles being open on their upper sides, as shown in Figs. 5 and 6. The front wall of the compartment 11 is provided with openings through which the receptacles project and each receptacle is provided at its front end with a flange $15^a$ that fits snugly against the front wall of said compartment and thus forms a tight joint.

The stove herein shown is adapted to use coal, coke, wood or charcoal for fuel and is therefore provided with a fire-box 16 and a removable ashpan 17, said fire-box being arranged under the broiling or frying compartment 8. The bottom of the compartment 8 is so constructed that it forms a rack or broiler upon which the food can be placed and one wall of said compartment is provided with a vent $16^a$ for carrying off the odors and fumes from said compartment. If desired, however, any other heating medium could be employed by slightly changing the construction of the stove, and consequently, I do not wish it to be understood that my broad idea is limited to a stove that uses the fuels above-mentioned.

The box-shaped members 8, 9, 10 and 11, which form the broiling, baking, warming and steam compartments, respectively, are so arranged that the heat from the fuel can circulate around said members or pass between the walls thereof, and the food receptacles 15 in the steam compartment are also so arranged that the steam can circulate around same and also come in direct contact with the articles of food therein. I also prefer to form the compartments and food receptacles in such a manner that they can be removed easily from the casing A and thus enable all parts of the stove to be thoroughly cleansed. To this end, I have arranged suitable supports inside of the casing A for the various compartments and receptacles so as to hold them out of contact with each other and also enable them to be drawn out of the casing when the doors in the front wall of the casing are opened, said front wall being provided with doors $8^a$, $9^a$, $10^a$ and $11^a$ for the compartments 8, 9, 10 and 11, respectively, and also a door $17^a$ for the fire-box and ashpan. The means herein shown for supporting the compartments consists of pieces of angle iron and channel iron but it will, of course, be obvious that said supporting means could be constructed in various other ways without departing from the spirit of my invention. The fire-box and ashpan are carried by a member 18 which is slidingly mounted on angles 19 arranged adjacent the bottom of the casing and the member 10, which forms the warming compartment, is also slidingly mounted on angles 20 arranged adjacent the bottom of the casing, as shown clearly in Fig. 3. The members 8 and 9, which form the broiling compartment and the baking compartment, are slidingly mounted on horizontally disposed angles 21 and 22, respectively, that extend from the front to the rear wall of the casing and have their ends connected to uprights arranged vertically inside of the inner shell of the casing. The member 11, which forms the steam compartment, is slidingly mounted on horizontally disposed angles 23 that are connected to said uprights, and the bottom of said member 11 is provided with a number of hollow cradles or supports 24 of skeleton construction on which the food receptacles 15 are slidingly mounted, said supports 24 being so constructed that the food receptacles are spaced away from each other, as shown clearly in Fig. 3. The front wall $15^a$ of each food receptacle is provided with a handle $15^b$ that can be grasped so as to pull said receptacle out of the steam compartment, and the front wall of said steam compartment is provided with a number of doors 25 that swing downwardly so as to close the openings in the front wall of the compartment 11 when the receptacles 15 are removed therefrom. A door 25 is provided for each receptacle, and said door normally lies above the receptacle when it is in operative position, as shown in Fig. 5, the upper edge of the door being pivotally connected or hinged to the front wall of the compartment 11 so that it will automatically drop down into position to close the opening in said front wall when the receptacle, with which it coöperates, is drawn out of the steam compartment. As shown in Figs. 1 and 3, a pipe 26 communicates with the interior of the casing so as to carry off the fumes and odors that arise from the food being cooked and also the products of combustion from the fuel.

A stove of the construction above described can be used for doing all kinds of cooking and for cooking all kinds of foods.

A cooking stove of the construction above described can be operated at a lower cost than the cooking stoves heretofore in use owing to the fact that all of the heat units are retained inside of the casing and circulate around the various compartments and receptacles in which the food is arranged. It also eliminates the discomfiture from excessive heat to the person who operates the stove for the temperature of the outer shell of the casing is the same as the surrounding atmosphere. And still another very desirable feature of my improved stove is that the odors and vapors arising from the articles of food being cooked cannot escape into the room in which the stove is located.

The stove is compact and presents a neat and ornamental appearance, and as all of the various compartments and receptacles are separated from each other a number of different articles of food can be cooked in different ways at the same time.

Having thus described my invention, what I claim as new and desire to secure by Letters Patent is:

1. A cooking stove comprising an approximately rectangular-shaped rigid casing constructed in such a manner that heat inside of same cannot radiate therefrom, means arranged in said casing for generating heat, compartments arranged in said casing for containing articles of food and being spaced away from each other and from the casing so that the heat can circulate around same, a hot water compartment adapted to hold water that is heated by the heat in said casing, a steam compartment adapted to hold water, and removable receptacles arranged in said steam compartment for containing articles of food and being so constructed that the steam can come in direct contact with the articles of food therein.

2. A cooking stove comprising a heat-insulated casing, a steam compartment arranged inside of same, removable receptacles arranged inside of said steam compartment for holding articles of food, and doors which automatically move into position so as to prevent steam from escaping from said steam compartment when the receptacles are completely removed from said compartment or drawn out of same.

3. A cooking stove comprising a casing having a steam compartment one wall of which is provided with an opening, a receptacle projecting into said steam compartment through said opening and normally acting as a closure for said opening, and a door or cover that moves automatically into position to close said opening when said receptacle is removed from the steam compartment.

4. A cooking stove comprising a casing having a steam compartment arranged inside of same one wall of said compartment being provided with an opening, an open receptacle which projects into said compartment through said opening, and a hinged or pivotally mounted lid normally lying above the top of said receptacle and adapted to move automatically into position to close the opening in the wall of the compartment when the receptacle is withdrawn from said compartment.

5. A cooking stove comprising a heat-insulated casing, a number of doors in one wall of said casing, a separate compartment coöperating with each of said doors and arranged inside of the casing in such a manner that heat can circulate around and between the same, one of said compartments being adapted to hold water that is converted into steam by the heat inside of the casing, and food receptacles removably mounted in said steam compartment.

6. A cooking stove comprising a heat-insulated casing, a supporting means arranged inside of said casing, a number of substantially box-shaped sheet metal members slidingly mounted in said supporting means and adapted to form separate compartments, a fire-box and ashpan arranged inside of said casing, one of said compartments being adapted to contain water that is converted into steam by the heat that circulates through said casing, and removable receptacles arranged in the compartment in which the steam is generated for holding articles of food that are to be cooked by a boiling or steaming process.

7. A cooking stove comprising a casing which consists of an inner shell and an outer shell with a filling of heat-insulating material interposed between same, supports arranged inside of said casing, a number of compartments consisting of hollow box-shaped members removably mounted on said supports, closures for each of said box-shaped members, one of said compartments having an opening formed in one wall thereof, a food receptacle projecting into said compartment through said opening, and a door that automatically closes said opening when said receptacle is removed.

8. A cooking stove comprising a casing which consists of an inner and an outer shell with a filling of heat-resisting material interposed between same, compartments arranged in said casing for containing food, a steam compartment arranged in said casing and adapted to contain water that is converted into steam, means for generating heat and causing it to circulate around all of said compartments, a number of food receptacles projecting into the steam compartment through openings in one wall thereof, doors which drop automatically into position to close said openings when said receptacles are removed, and insulated doors for each of said compartments.

In testimony whereof I hereunto affix my signature in the presence of two witnesses, this fifth day of December, 1908.

CHARLES B. ADAMS.

Witnesses:
 WELLS L. CHURCH,
 GEORGE BAKEWELL.